Jan. 2, 1968     L. J. WOLF     3,361,443

TANDEM WHEEL SUSPENSION

Filed April 1, 1966     3 Sheets-Sheet 1

INVENTOR:
LLOYD J. WOLF
BY Bedell & Burgess
ATTORNEYS

Jan. 2, 1968 L. J. WOLF 3,361,443
TANDEM WHEEL SUSPENSION
Filed April 1, 1966 3 Sheets-Sheet 2

INVENTOR:
LLOYD J. WOLF
BY Bedell & Burgess
ATTORNEYS

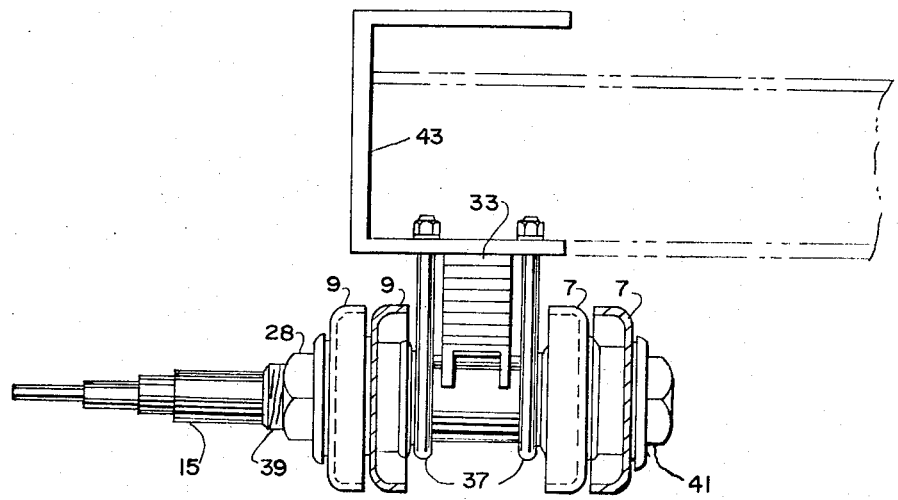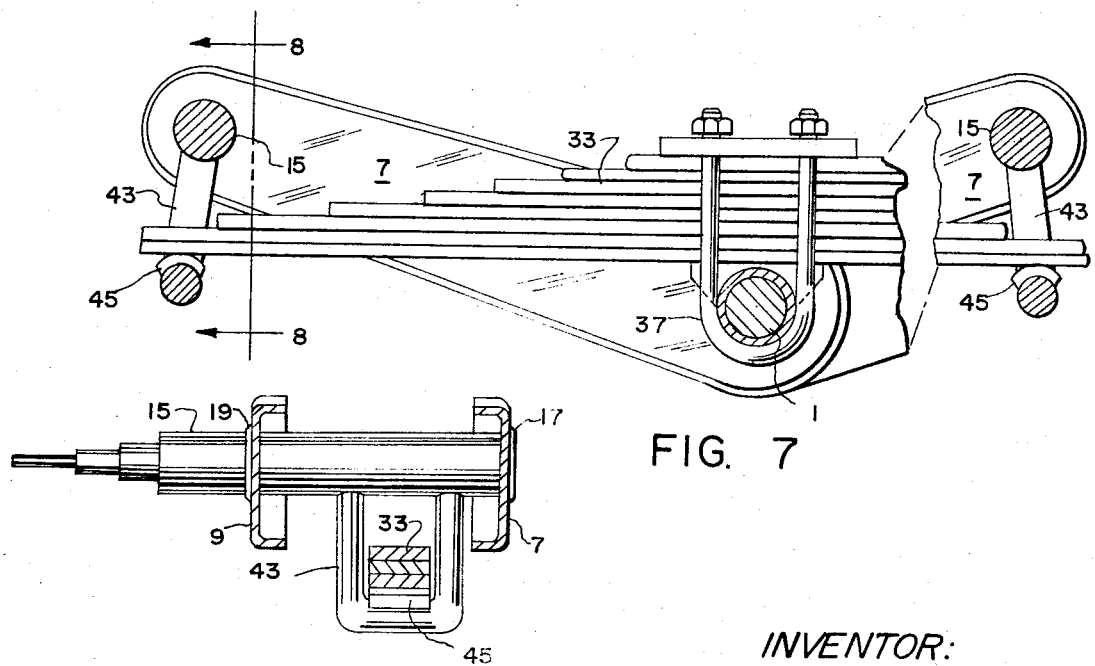

United States Patent Office 3,361,443
Patented Jan. 2, 1968

3,361,443
TANDEM WHEEL SUSPENSION
Lloyd J. Wolf, 2425 Irving Blvd.,
Dallas, Tex. 75207
Filed Apr. 1, 1966, Ser. No. 539,514
5 Claims. (Cl. 280—104.5)

The invention relates to land vehicles and consists particularly in an improved tandem wheel suspension for highway trailers.

In the prior art, tandem wheel assemblies have been provided with separate arms mounting axles or wheel spindles at their remote ends, with their adjacent ends pivotally connected, at points spaced apart lengthwise of the vehicle, to the vehicle frame, and a leaf spring supported at its ends on the axles or wheel spindles and supporting the vehicle frame intermediate its ends. Such suspensions are subject to a condition known as "brake hop" wherein, if the brakes are applied at high speed, it is the tendency of the wheel arms to rotate clockwise about their respective axles or wheel spindles, the forward arm exerting an upward force and the rear arm exerting a downward force on the frame. Since the rear arm's downward force cannot lower the frame, the rear arm tends to lift the rear end of the spring, which begins to rock, causing the entire trailer to commence similar "hopping."

Objects of the invention include the provision of a tandem wheel assembly in which elevation of any of the wheels due to bumps in the roadway will have no effect on the other wheels, in which brake reactions will be completely cancelled, which solves the problem of wheel track, and which is usable with extremely low floor vehicles, such as horse trailers.

The foregoing and additional more detailed objects and advantages are achieved by the construction described below and illustrated in the accompanying drawings, in which:

FIG. 6 is a transverse vertical sectional view corresponding to FIG. 5, but illustrating a modified form of the invention.

FIG. 7 is a fragmentary longitudinal vertical sectional view corresponding to FIG. 3, but showing another form of the invention.

FIG. 8 is a transverse vertical sectional view along line 8—8 of FIG. 7.

Figure 1:
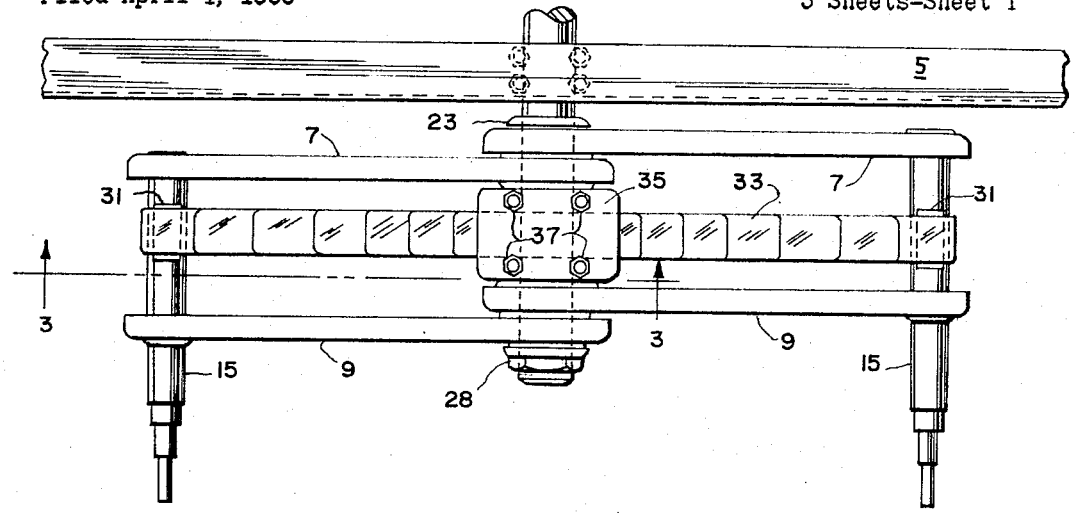
FIG. 1 is a top view of one side of a tandem axle assembly constructed according to my invention.
Figure 2:
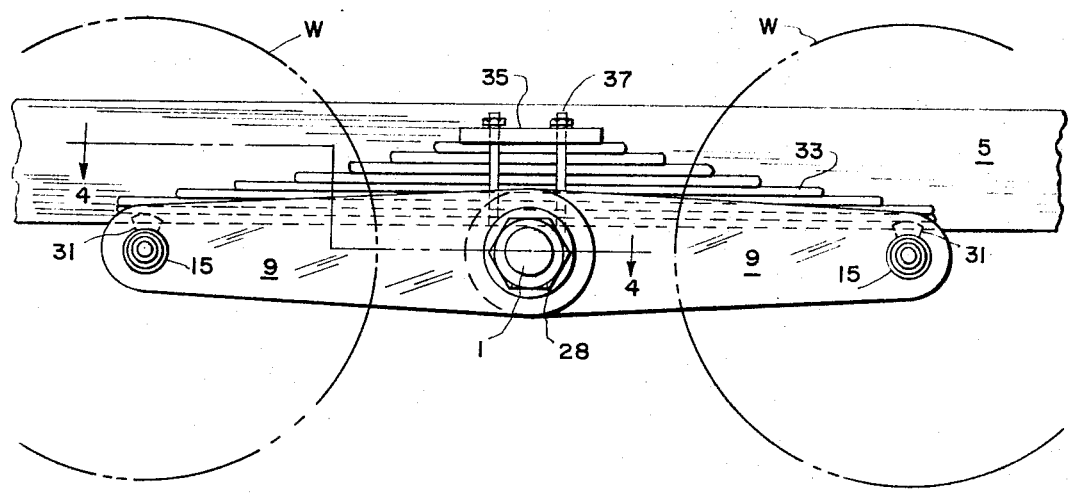
FIG. 2 is a side elevation view of the assembly illustrated in FIG. 1.
Figure 3:
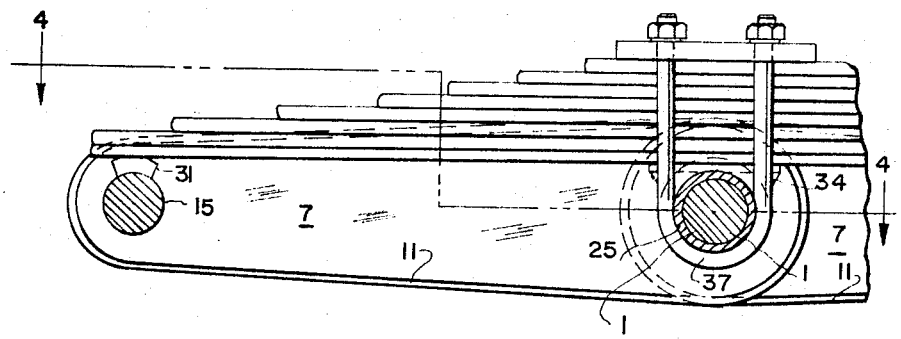
FIG. 3 is an enlarged fragmentary longitudinal vertical sectional view taken along line 3—3 of FIG. 1.
Figure 4:
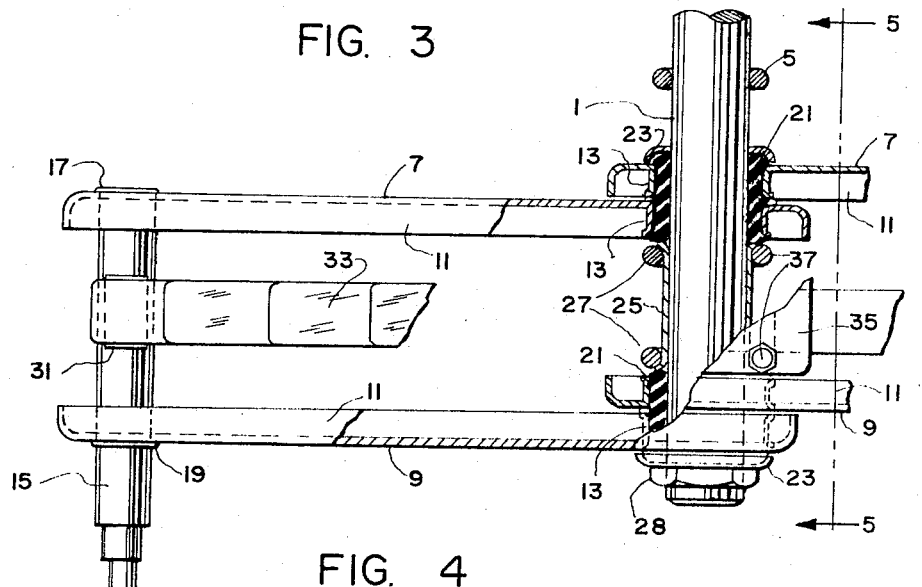
FIG. 4 is an enlarged fragmentary top view along line 4—4 of FIGS. 1 and 3.
Figure 5:
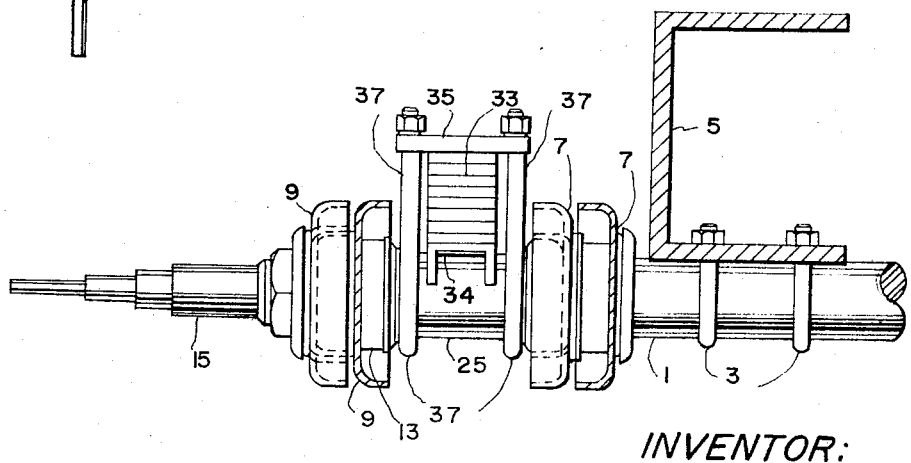
FIG. 5 is a transverse vertical sectional view along line 5—5 of FIG. 4.

The suspension comprises a cylindrical central supporting shaft 1, extending transversely of the vehicle and suitably secured, as by U-bolts 3 to the vehicle frame 5.

On the end portions of shaft 1 protruding laterally from frame 5, are pivotally mounted a pair of wheel arms each comprising a pair of transversely spaced arm members 7 and 9, preferably, for lightness and strength, formed of sheet metal stampings with a peripheral flange 11, and a hole punched and drawn to form a circular flange 13 surrounding shaft 1.

In their ends remote from shaft 1, arm members 7 and 9 are formed with aligned holes through which wheel spindles 15 pass, the latter being welded to arms 7 and 9 at 17 and 19 respectively, to form, with arms 7 and 9, rigid wheel arms.

To accommodate pivotal movements of wheel arms 7, 9, 15 about supporting shaft 1, flanges 13 are of substantially larger diameter than shaft 1, and nonmetallic bushings 21, preferably of rubber or other elastomeric material, are compressed into the annular spaces between shaft 1 and flanges 13, the ends of the bushings protruding from the flanged holes. Inwardly and outwardly of inner arm member 7 and outer arm member 9, bushings 21 are retained by cup-shaped annular cap 23, and proper spacing of the bushings and inner and outer arm member pairs is maintained by spacer sleeve 25 mounted on shaft 1 between outer arm member 7 and inner arm member 9 and is flared at its ends as at 27 for engagement with the adjacent ends of bushings 21. The arms, bushings, caps and spacers are retained on shaft 1 by nuts 28 on the threaded ends of the shaft protruding from outer caps 23. With rubber or other elastomeric material bushings, pivoting of arms 7 and 9 on shaft 1 is accommodated through torsional shear in the bushings, this making lubrication of the pivots unnecessary. Other types of bushings such as nylon may be used, however, if desired.

From the foregoing it will be evident that the sole function of wheel arms 7, 9, 15 is to position the spindles 15 and the wheels W transversely of the vehicle and longitudinally of the vehicle with respect to shaft 1. The wheel arms do not carry any vertical load.

For supporting the vertical load, intermediate arms 7 and 9, wheel spindles 15 are formed with upwardly directed arcuate spring seats 31, on which are seated the end portions of a leaf spring 33.

The middle of spring 33 extends across the top of support shaft 1 and spacer 25, the latter being provided with upwardly facing saddle 34, the flat upper surface of which provides a bearing for the bottom of the spring. Spring 33 is surmounted by a flat cap plate 35 slightly wider than the spring and a pair of U-bolts 37 depending from cap plate 35 surround spacer 25 adjacent its flared ends 27 to hold the spring, saddle, and spacer in engagement with each other, and thereby support shaft 1 from the spring and indirectly from the wheel spindles.

FIG. 6 illustrates a modified form of the invention for use on low floor trailers such as horse trailers where the through support shaft would not be feasible. In this embodiment bolt 39 is substituted for each end portion of supporting shaft 1, with its head 41 engaging inner bushing retainer cap 23, and U-bolts 37 are secured to the trailer frame 43 which rests on top of spring 33.

FIGS. 7 and 8 illustrate another modification which makes possible a low floor construction, while retaining the full length supporting shaft 1. With this arrangement it is possible to position the supporting shaft 1 at a substantially higher level than wheel spindle 15, by providing stirrups 43 depending from wheel spindles 15 between inner arm members 7 and outer arm members 9, the latter being normally inclined upwardly from supporting shaft 1 as best seen in FIG. 8. Stirrups 43 are provided, on their horizontal portion, with upwardly facing arcuate seats for supporting the ends of leaf spring 33, which thus remains horizontal even though its middle portion is secured to supporting shaft 1 by U-bolts 37. With this construction shaft 1 is sufficiently lower than the wheel spindles that it can underlie a vehicle floor position at a substantially lower level than the wheel spindles.

The details of the tandem wheel suspensions disclosed herein may be modified substantially without departing from the spirit of the invention and the exclusive use of such modifications as come within the scope of the appended claims is contemplated.

What is claimed is:

1. A vehicle tandem wheel suspension comprising structure extending transversely of the vehicle, a pair of arms at each side of the vehicle, said arms at each side being pivotally mounted at one end on said structure on a common axis transverse of the vehicle and extending therefrom in opposite directions lengthwise of the vehicle, said arms having at their remote ends wheel mounting spindles, a leaf spring extending lengthwise of the vehicle between said spindles and being supported at its ends therefrom, and means supporting said structure from said spring intermediate the ends of said spring, each of said wheel arms comprising a pair of arm members spaced apart transversely of the vehicle, said wheel spindles extending between and being rigidly secured to both said arm members of each said arm, said springs being positioned in the spaces between said transversely spaced arms and being supported at their ends from the portions of said spindles extending between said arms.

2. A vehicle tandem wheel suspension comprising structure extending transversely of the vehicle, a pair of arms at each side of the vehicle, said arms at each side being pivotally mounted at one end of said structure on a common axis transverse of the vehicle and extending therefrom in opposite directions lengthwise of the vehicle, said arms having at their remote ends wheel mounting spindles, a leaf spring extending lengthwise of the vehicle between said spindles and being supported at its ends therefrom, and means supporting said structure from said spring intermediate the ends of said spring, the supports for said spring from said wheel spindles being at a lower level than said wheel spindles whereby to accommodate the location of said pivotal axis at a lower level than said spindles.

3. A vehicle tandem wheel suspension comprising structure extending transversely of the vehicle, a pair of arms at each side of the vehicle, said arms at each side being pivotally mounted at one end on said structure on a common axis transverse of the vehicle and extending therefrom in opposite directions lengthwise of the vehicle, said arms having at their remote ends wheel mounting spindles, a leaf spring extending lengthwise of the vehicle between said spindles and being supported at its ends therefrom, and means supporting said structure from said spring intermediate the ends of said spring, the pivotal mounting of said arms including a transversely extending cylindrical member at substantially the same level as said wheel spindles, said spring overlying said cylindrical member, said cylindrical member being dependingly supported from said spring, there being elements depending from said spindles, the support of the ends of said spring being on said elements at a lower level than said spindles.

4. A vehicle tandem wheel suspension comprising structure extending transversely of the vehicle, a pair of arms at each side of the vehicle, said arms at each side being pivotally mounted at one end on said structure on a common axis transverse of the vehicle and extending therefrom in opposite directions lengthwise of the vehicle, said arms having at their remote ends wheel mounting spindles, a leaf spring extending lengthwise of the vehicle between said spindles and being supported at its ends therefrom, and means supporting said structure from said spring intermediate the ends of said spring, each of said wheel arms comprising a pair of arm members spaced apart transversely of the vehicle, said wheel spindles extending between and being rigidly secured to both said arm members of each said arm, said structure including a transverse cylindrical member, said arm members forming both said arms being provided with transversely aligned circular apertures in their adjacent ends, said cylindrical member extending through said apertures and forming therewith the pivotal mounting of said arms, said apertures being of greater diameter than said cylindrical member, there being bushings of nonmetallic material in the annular spaces surrounding said cylindrical members within the apertures to accommodate pivotal movements of said arms on said cylindrical members with a minimum of wear.

5. A vehicle tandem wheel suspension according to claim 4 in which said bushings are of elastomeric material.

References Cited

UNITED STATES PATENTS

| | | | |
|---|---|---|---|
| 2,978,252 | 4/1961 | Osborne | 280—104.5 X |
| 1,930,208 | 10/1933 | Marcum | 280—104.5 |
| 1,912,308 | 5/1933 | Rayburn | 280—104.5 |

FOREIGN PATENTS 1,017,922  10/1957  Germany.

BENJAMIN HERSH, *Primary Examiner.*

P. GOODMAN, *Assistant Examiner.*